United States Patent [19]

Liedenbaum et al.

[11] Patent Number: 5,867,520
[45] Date of Patent: Feb. 2, 1999

[54] OPTICAL UNIT FOR MULTIPLYING THE FREQUENCY OF A CLOCK SIGNAL

[75] Inventors: Coen T. H. F. Liedenbaum; Engelbertus C. M. Pennings, both of Eindhoven; Raymond Van Roijen, Yorktown Heights; John J. E. Reid, Eindhoven; Lukas F. Tiemeijer, Eindhoven; Bastiaan H. Verbeek, Eindhoven, all of Netherlands

[73] Assignee: U.S. Philips Corporation, New York, N.Y.

[21] Appl. No.: 813,414
[22] Filed: Mar. 10, 1997

[30] Foreign Application Priority Data

Mar. 15, 1996 [EP] European Pat. Off. ............. 96200722

[51] Int. Cl.⁶ ..................................................... H01S 3/083
[52] U.S. Cl. ............................... 372/94; 327/119; 372/97
[58] Field of Search .................................. 372/92–94, 97, 372/6; 356/349, 350; 327/113, 116, 119, 123

[56] References Cited

U.S. PATENT DOCUMENTS 5,327,448  7/1994  Holonyak, Jr. et al. ................. 372/94
5,438,300  8/1995  Saban et al. ............................... 331/16

OTHER PUBLICATIONS

"Monolithic Passively Mode–Locked Semiconductor Lasers" R. Van Roijen et al, Proceedings of SPIE, Photonics West, Jan. 27, 1996, San Jose, CA, 10 pp.

"All Optical Clock Recovery from 5GB/S RZ Data Using a Self Pulsating 1.56 $\mu M$ Laser Diode" P.E. Barnsley, IEEE Photonics Technology Letters, vol. 3, No. 10, Oct. 1991, pp. 942–945.

Primary Examiner—John D. Lee
Attorney, Agent, or Firm—Steven R. Biren

[57] ABSTRACT

An optical unit for multiplying the frequency of a clock signal includes at least two series-arranged ring lasers. Each ring laser has a different resonance frequency $f_i$. The unit has an input for receiving a signal, for example, a low-frequency electric signal for modulating one of the ring lasers. The repetition frequency of at least one of the ring lasers is variable by adapting the optical path length of the resonator.

6 Claims, 6 Drawing Sheets

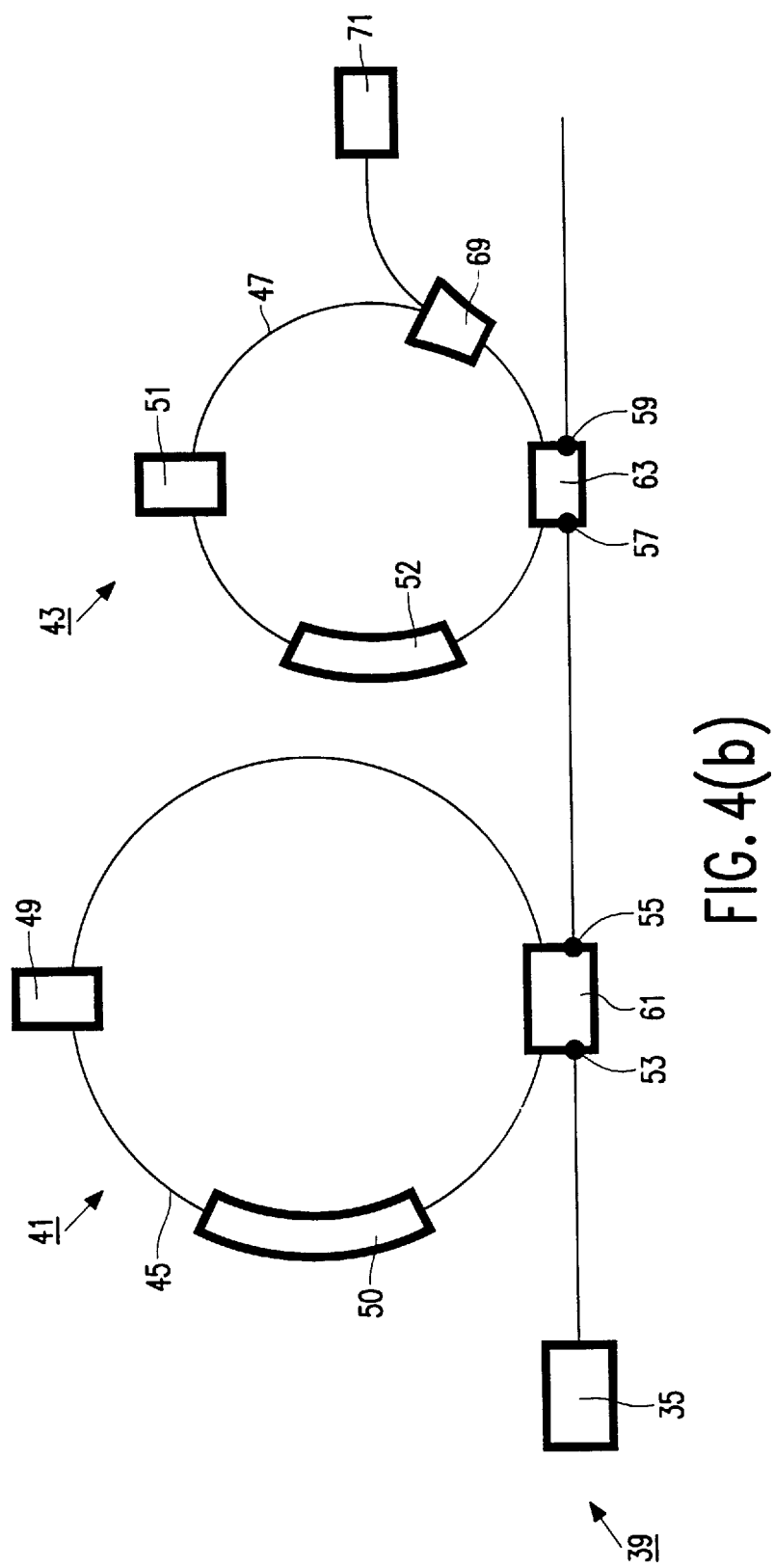

OPTICAL UNIT FOR MULTIPLYING THE FREQUENCY OF A CLOCK SIGNAL

BACKGROUND OF THE INVENTION

The invention relates to an optical unit for multiplying the frequency of a clock signal.

The invention also relates to a high-frequency carrier transmission system in which the receiver is provided with such an optical unit.

In systems operating with high-frequency signals, i.e. signals having a frequency of more than 10 GHz, there is the problem that the current electronic components are not rapid enough and are thus not satisfactory. 10 GHz may be considered to be an electronic barrier. Moreover, in many cases, these systems also comprise semiconductor lasers which can generally be modulated only to frequencies of 10–15 GHz maximum. Applications in which high-frequency signals are desired, which may also play an important role in future, are, for example, satellite transmission, optical telecommunication and mobile telephony.

In such systems, inter alia, high transmission rates are aimed at. To be able to detect data transmitted at high transmission rates, in other words data series having a relatively high modulation frequency, as faultlessly as possible, the repetition frequency of the clock signal should also be increased.

SUMMARY OF THE INVENTION

It is an object of the invention to provide an optical unit with which it is possible to generate a high-frequency clock signal which is synchronized in frequency with the original, low-frequency clock signal, without the electronics being a restrictive factor.

To this end, the optical unit according to the invention comprises at least two series-arranged ring lasers, wherein each ring laser has a different resonance frequency $f_i$, said unit further having an input for receiving a signal for modulating one of the ring lasers, the repetition frequency of at least one of the ring lasers being variable.

A ring laser is a known laser described in, for example, the article: "Monolithic passively mode-locked semiconductor lasers" by R. van Roijen et al. in Proceedings of SPIE— Photonics West, Jan. 27, 1996, San Jose, Calif. The laser consists of an annular resonator accommodating a laser medium in the form of an active amplifier or an amplifying medium. When the laser medium is activated, radiation will be generated which propagates through the resonator. The ring is provided with a saturable absorber whose losses determine the laser action of the ring laser. Moreover, the ring accommodates a multimode interference (MMI) coupler which ensures that the radiation generated in the ring can also be coupled out. The operating principle of a ring laser is based on the fact that the position of the absorber in the ring does not play a role.

The repetition frequency of a ring laser is given by $f_{rep} \approx 1/n.L$, in which n is the refractive index and L is the length of the resonator. It follows that the repetition frequency can be adapted by varying the optical path length n.L. In contrast to the electronic components, high frequencies can be realized more easily because small rings can be manufactured in a relatively simple manner.

By applying a low-frequency signal, for example, an electric signal having a frequency of 10 GHz via the input of the optical unit, the electric signal is converted into an optical signal. Subsequently, a high-frequency optical pulse series can be formed with reference to the optical pulse series thus formed, which high-frequency optical pulse series will be synchronized with the original signal. The electric signal may be applied to the ring laser by varying the absorption of the absorber, for example, in conformity with the electric signal, by connecting a modulator to one of the gates of the coupler or by varying the amplification of the laser medium in conformity with the electric signal.

The resonator of the first ring laser is forced, as it were, to supply optical pulses at a given frequency. A condition is that the frequency of the electric signal and the frequency of the signal which the ring laser is capable of generating itself, or a multiple of said frequencies, are not far apart. The magnitude of the multiple is determined by the memory action of the ring laser.

In a preferred embodiment of the optical unit according to the invention, two successive ring lasers have such a characteristic that $k.f_2 = m.f_1$ holds for the repetition frequencies $f_1$ and $f_2$, respectively, of these ring lasers, in which k and m are integers.

In order that the two ring lasers are synchronized with each other, the repetition frequency of the second laser should be an integral multiple of the repetition frequency of the first laser, or the repetition frequencies of these lasers should have a smallest common multiple. The light injected into the second ring laser and originating from the first ring laser will ensure that the absorber of the second ring laser is bleached and that subsequently a well-defined start for the laser action is imposed on the second ring laser.

In a further embodiment of the optical unit according to the invention, an extent of radiation causing a charge carrier density change resulting in a change of the repetition frequency is injectable into the resonator of the ring laser having a variable repetition frequency.

By injecting high-intensity radiation into the resonator of, for example the second ring laser, the charge carrier density will be influenced. At a sufficient change of the charge carrier density, the repetition frequency will change. The radiation may be injected, for example, via an extra coupler which is arranged in the resonator.

In another embodiment of the optical unit according to the invention, the resonator of the ring laser having a variable repetition frequency is provided with a segment in which current is injectable into the resonator.

The optical path length will change as a result of this current injection.

In yet another embodiment of the optical unit according to the invention, the resonator of the ring laser having a variable repetition frequency is provided with means with which the temperature of the resonator is variable.

The optical path length and hence the repetition frequency will also change by varying the temperature of the resonator. The means may be constituted, for example, by a Peltier element.

These and other aspects of the invention will be apparent from and elucidated with reference to the embodiments described hereinafter.

BRIEF DESCRIPTION OF THE DRAWINGS

In the drawings:

FIGS. 4(a) to 4(c) show some embodiments of a part of an optical unit according to the invention, in which two ring lasers are synchronized with each other and in which means are provided for varying the optical path length of one of the ring lasers.

BRIEF DESCRIPTION OF THE PREFFERRED EMBODIMENTS

Figure 1:
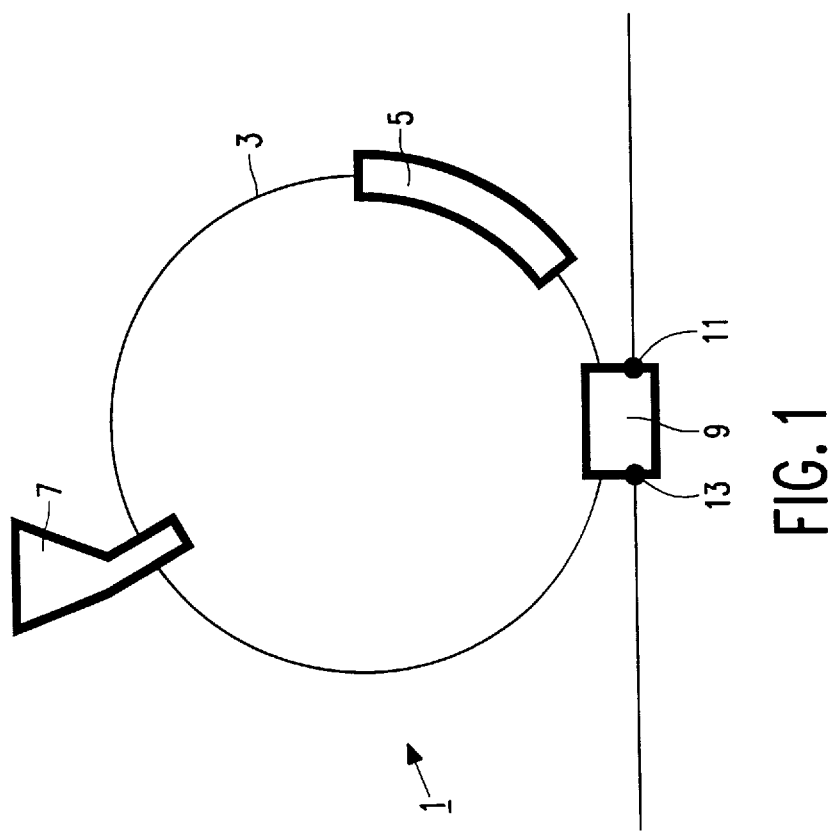
FIG. 1 shows an embodiment of a known ring laser.

The ring laser 1 shown in FIG. 1 is constituted by an annular resonator 3. The resonator 3 accommodates a laser medium 5, a saturable absorber 7 and a coupler 9. When the laser medium 5 is activated, radiation will be generated in the resonator 3. The operating principle of a ring laser is based on the fact that the position of the absorber 7 in the resonator 3 does not play a role. The coupler 9 provides the possibility of coupling out the radiation generated in the resonator 7 via the first gate 11 or the second gate 13. It is alternatively possible to inject radiation into the resonator 7 via one of the gates 11, 13 and thus impose a given repetition frequency on the ring laser 1 or modulate the pulse series of the ring laser 1 with data.

The repetition frequency $f_{rep}$ of a ring laser is given by:

$$f_{rep} \approx 1/n.L$$

in which n is the refractive index and L is the length of the resonator. It follows that the repetition frequency can be varied by changing the optical path length n.L. The optical path length may be changed by changing, for example, the charge carrier density by means of a separate current injection into the ring via a segment, radiation injection into the ring via a coupler, or by changing the temperature of the ring.

Figure 2:
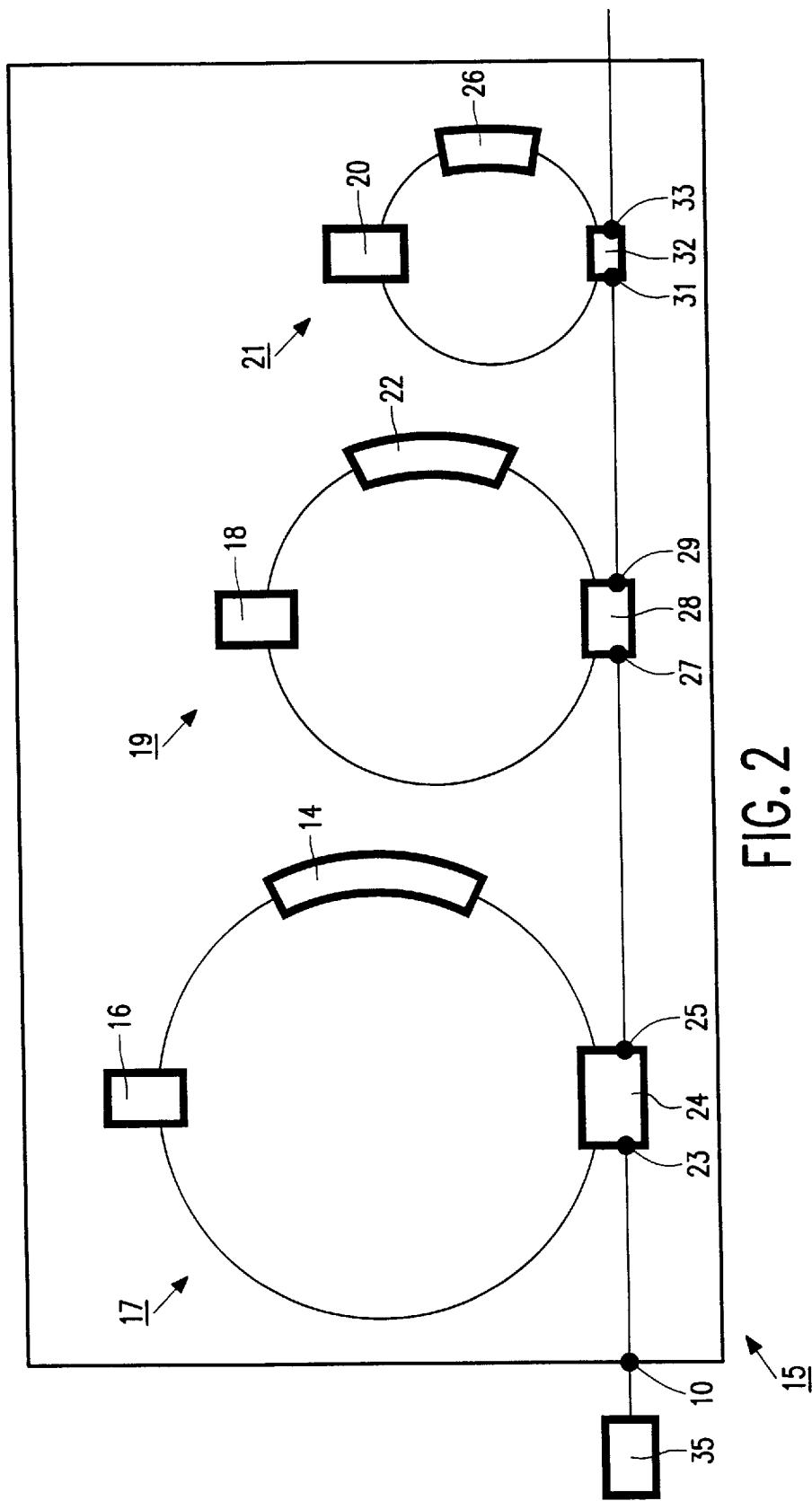
FIGS. 2 and 3 show two embodiments of an optical unit according to the invention, in which three ring lasers can be synchronized with each other.
Figure 3:
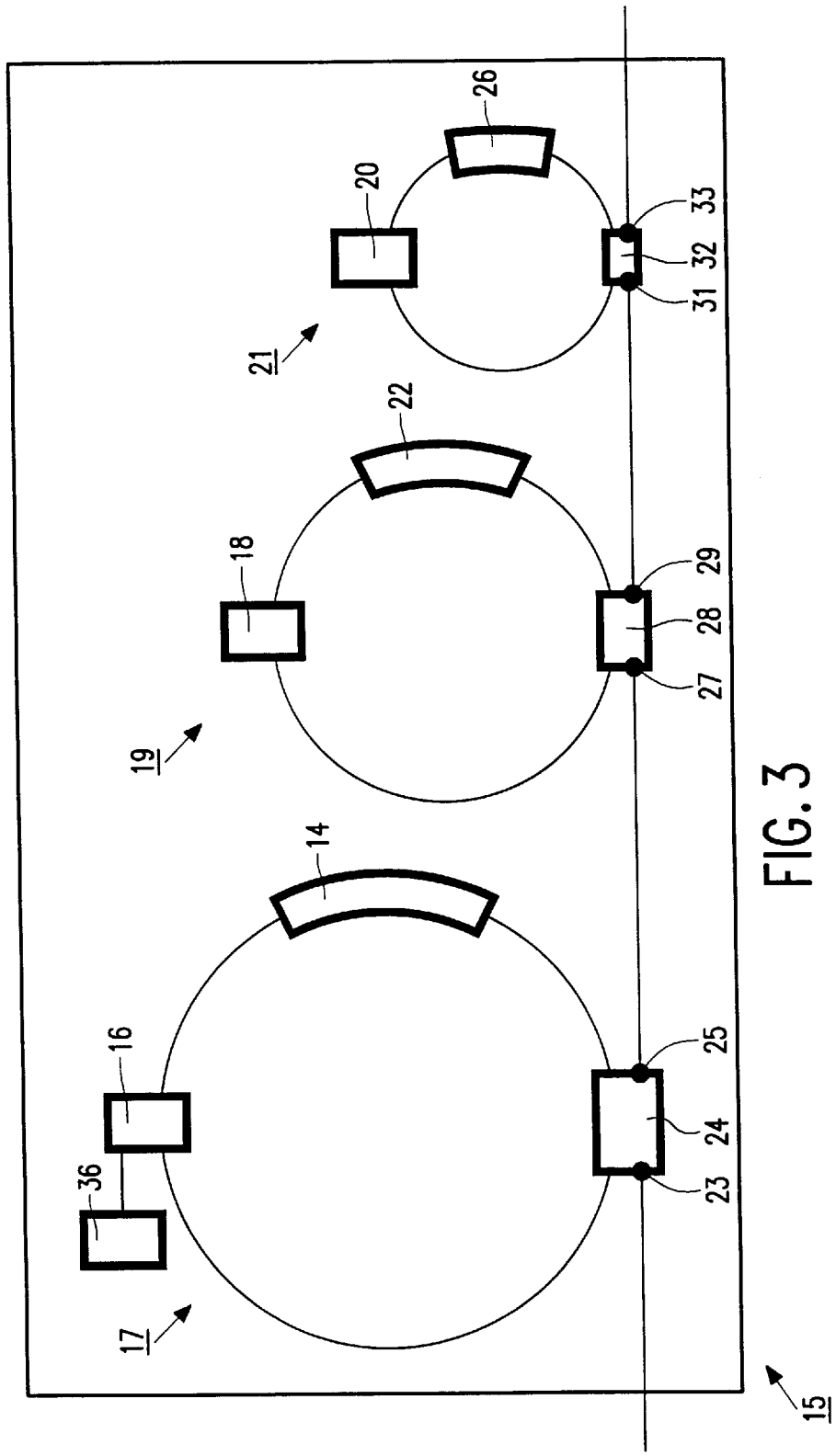

FIG. 2 shows an optical unit 15 according to the invention. The unit 15 comprises three series-arranged ring lasers 17, 19, 21. Each ring laser 17, 19, 21 is provided with a coupler 24; 28; 32 each having a first and a second gate 23, 25; 27, 29; 31, 33, respectively. The second gate 25 of the first ring laser 17 is connected to the first gate 27 of the second ring laser 19. The second gate 29 of the second ring laser 19 is connected to the first gate 31 of the third ring laser 21. Moreover, each ring laser 17, 19, 21 is provided with a saturable absorber 16; 18; 20. The laser medium is denoted by the reference numerals 14, 22 and 26, respectively. Via the first gate 23 of the first ring laser 17, for example, a pulse series from a diode laser 35, or a signal from a modulator, may be applied to the first ring laser 17 via the input 10 of the optical unit 15. The diode laser 35, or the modulator, may or may not form part of the optical unit 15. Provided that the repetition frequency of the applied signal from the diode laser 35 and the repetition frequency which the ring laser 17 is capable of generating itself, or a multiple of these frequencies, are not too far apart, the ring laser 17 will generate radiation at a repetition frequency which is synchronized with the repetition frequency of the pulse series of the diode laser 35. The applied pulse series may be, for example, a data series. Another way of operating the ring laser at a given repetition frequency is to vary the absorption of the saturable absorber in conformity with the signal to be applied to the ring laser. Yet another possibility is to vary the amplification of the laser medium in conformity with the signal to be applied. The diode laser 35, or the modulator, may be dispensed with in this case. Instead, a control unit 36 is required for the absorber 16 or the laser medium 14, as is shown in FIG. 3.

If the repetition frequency of the signal to be applied to the ring laser, or a multiple of this frequency, and the repetition frequency of the ring laser do not exactly match, the repetition frequency of the ring laser 17 can be adjusted by adapting or correcting the optical path length n.L of the resonator of this laser. This may be realized by means of current injection into the resonator, radiation injection into the resonator or a temperature change of the resonator. The extent of adaptation or correction may be determined, for example, from the comparison of the repetition frequency of the signal to be applied with that of the signal generated by the ring laser. When comparing two frequencies, a signal of the difference frequency is produced, which signal is referred to as beat signal. Since the difference between these two frequencies may be relatively large in practice, dependent on the memory action of the ring laser, multiples of the two frequencies are preferably compared with each other, because a detector such as, for example a photodetector is only capable of measuring frequencies which are much lower than the difference frequency between the original signal and the signal generated in the first ring laser. In this way, a very high frequency and a very low frequency can be compared with each other. This way of comparison is also applicable to all ring lasers to be synchronized with each other in the optical unit according to the invention. The correction of the ring laser which must take over a signal will be further described in detail with reference to FIGS. 4(a) to 4(c).

The repetition frequency or resonance frequency of the first ring laser may already be a multiple of the presented frequency. The allowed difference factor between the repetition frequency of the radiation injected into a ring laser and the resonance frequency of this ring laser is determined by the memory action. This means that this factor is determined by the stability with which the injected pulse shape memorizes its own phase and does not take over that of the resonator into which it was injected. Consequently, at a relatively satisfactory memory action, a very low repetition frequency can be presented to a ring laser having a much higher resonance frequency than the repetition frequency of the presented signal. The better the memory action, the fewer steps are necessary to realize a high-frequency signal. The memory action principle is known per se and is applied and described, for example, in the article: "All-optical clock recovery from 5 Gb/s RZ data using a self-pulsating 1.56 $\mu$m laser diode", by P. E. Barnsley in IEEE Photonics Technology Letters, Vol. 3, No. 10, Oct. 1991.

In order that the second ring laser 19 is synchronized with the first ring laser 17, it should hold for the frequencies $f_1$ and $f_2$ that:

$$k.f_1 \approx m.f_2$$

in which k and m are integers. In that case, the light injected into the second ring laser and coming from the first ring laser will ensure that the absorber of the second ring laser is bleached and that subsequently a well-defined start for the laser action is imposed on the second ring laser. The second ring laser 19 may have such a diameter that the repetition frequency of this ring laser 19 is substantially a multiple of the repetition frequency of the first ring laser 17 (k=1). The third ring laser 21 then has such a diameter again that its repetition frequency is a multiple, or has a smallest common multiple with the repetition frequency of the second ring laser 19 and consequently also of the first ring laser 17. Thus, a pulse series having a repetition frequency which is a multiple of the original pulse series, or a pulse series at a frequency having a smallest common multiple with the frequency of the original pulse series is supplied from the second gate 33 of the third ring laser 21. The three pulse series will be synchronized with each other. The second gate 33 of the third ring laser 21 may be connected, for example, to an optical switch which is used, for example in a receiver for detecting a transported data series.

In this way it is possible to generate a clock signal which has a much higher frequency than the original clock signal and is synchronized in frequency therewith.

Figure 4A:
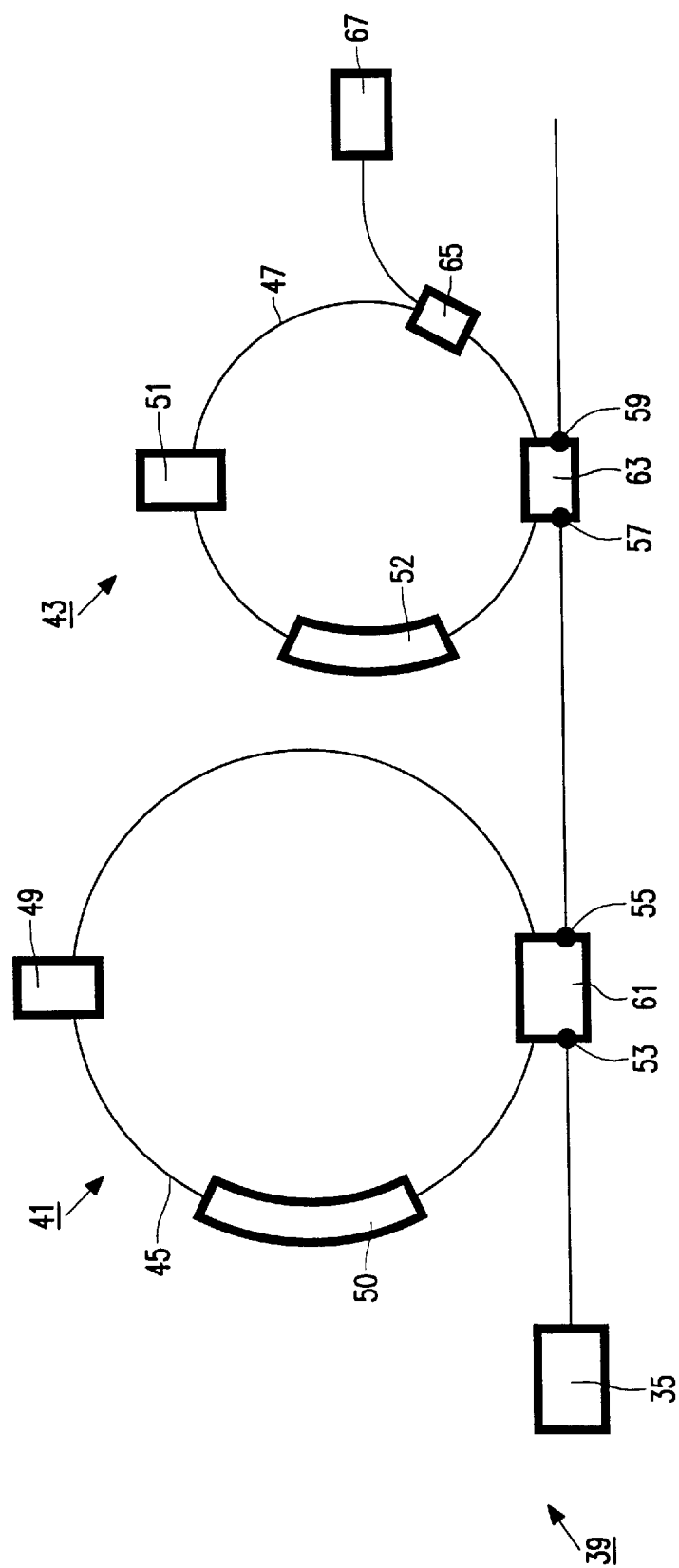
Figure 4C:
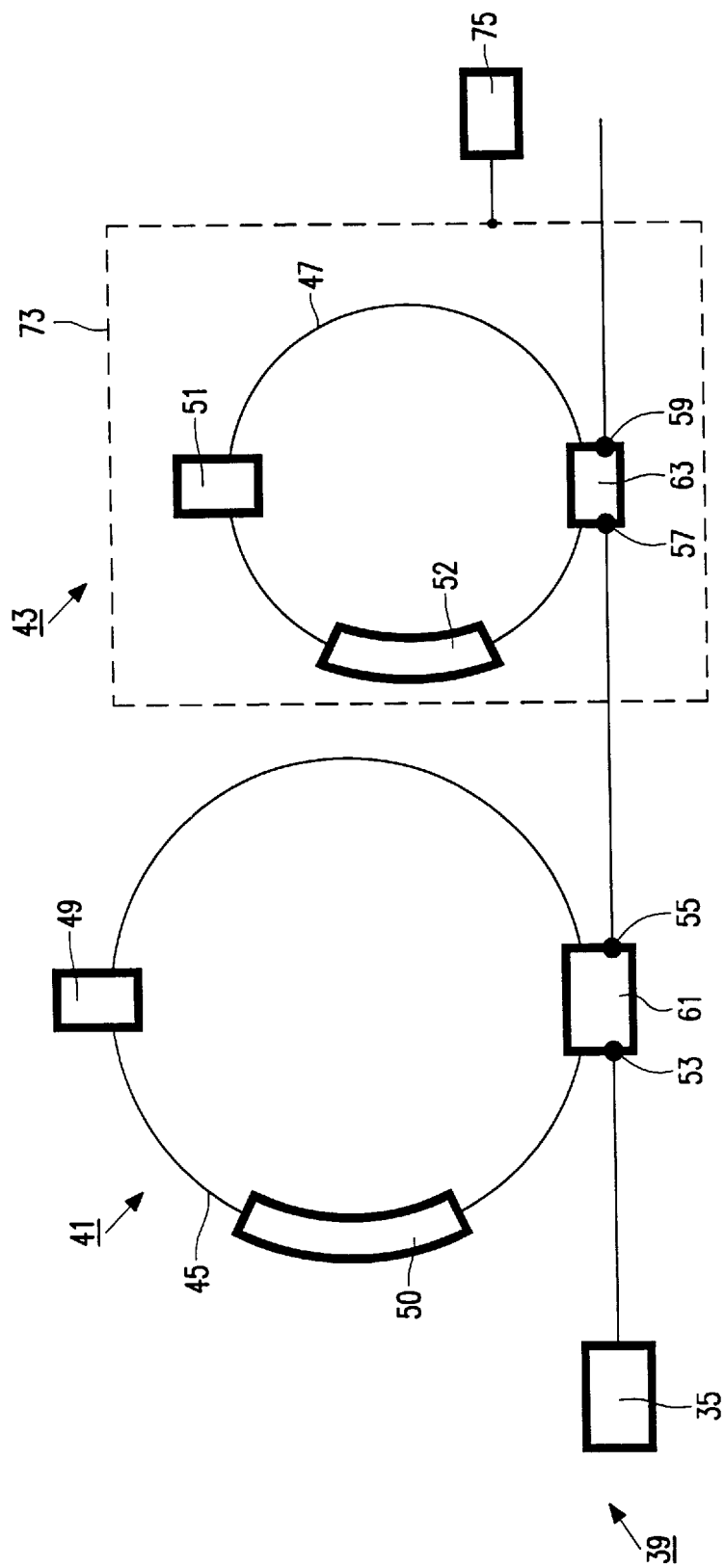

If the lengths L of the resonators of the ring lasers which must be synchronized with each other do not completely "match" with the injected repetition frequency, the optical path length n.L of the relevant ring laser may be adapted by means of current injection into the resonator, radiation injection into the resonator or a temperature change of the resonator. FIGS. 4(a) to 4(c) illustrate these three possibilities for a part of optical unit 39 with two ring lasers 41, 43, in which the optical path length of the second ring laser 43 can be adapted. On the other hand, all ring lasers in a series may be provided with this fine-control facility.

In each FIG. 4(a) to 4(c), the first ring laser 41 has a resonator 45 which is provided with a saturable absorber 49 and a laser medium 50. Moreover, the resonator 45 comprises a coupler 61 having a first gate 53 and a second gate 55. The second ring laser 43, having a diameter which is smaller and thus a repetition frequency which is higher, comprises a resonator 47 which is provided with a saturable absorber 51 and a laser medium 52. Moreover, a coupler 63 is provided, which has a first gate 57 and a second gate 59. The second gate 55 of the first ring laser 41 is connected to the first gate 57 of the second ring laser 43.

For example, radiation can be injected into the first ring laser 41 via the first gate 53 of the first ring laser 41. The resonator 45 of the first ring laser 41 should have such a length that the repetition frequency of the radiation generated in the ring laser 41 has a smallest common multiple with the repetition frequency of the injected radiation, or is an integral multiple thereof. Subsequently, the part of this radiation, which is coupled out at the second gate 55, is injected into the second ring laser 43. Provided that the repetition frequency which the second ring laser 43 would be capable of generating itself is substantially a multiple of the repetition frequency of the injected radiation, or provided that the two frequencies have a smallest common multiple, the second ring laser 43 is coupled to the first ring laser. If this is not the case, for example, the optical path length of the second ring laser 43 may be changed until the repetition frequency has become a multiple of that of the first ring laser or has a smallest common multiple therewith. The pulse series generated by the second ring laser 43 will then be automatically coupled to the signal injected into the first ring laser 41.

In FIG. 4(a) the resonator 47 of the second ring laser 43 is provided with an extra coupler 65 in the ring. High-intensity radiation, coming from a high-intensity source 67, is injected via this coupler 65. Consequently, the charge carrier density in the resonator 47 and hence the repetition frequency of the ring laser 43 will change.

Another possibility is shown in FIG. 4(b) in that current is injected into the resonator 47 of the second ring laser 43 via a segment 69 which is present in the resonator 47 and driven by means of a current source 71.

In accordance with yet another possibility, shown in FIG. 4(c), the temperature of the resonator 47 is varied, for example, by means of a Peltier element 73 which is driven by means of a control element 75.

The high-intensity source 67, the current source 71 and the control element 75 may be driven by means of the signal from a detector (not shown) which measures the beat signal between the (multiples of the) two frequencies of the signals to be synchronized with each other.

What is claimed is:

1. An optical unit for multiplying the frequency of clock signals, which unit comprises at least two series-arranged ring lasers, wherein each ring laser has a different resonance frequency $f_i$, said unit further having an input for receiving a signal for modulating one of the ring lasers, the repetition frequency of at least one of the ring lasers being variable.

2. An optical unit as claimed in claim 1, wherein two successive ring lasers have such a characteristic that $k.f_2 = m.f_1$ holds for the repetition frequencies $f_1$, and $f_2$, respectively, of said ring lasers, in which k and m are integers.

3. An optical unit as claimed in claim 1, wherein an extent of radiation causing a charge carrier density change resulting in a change of the repetition frequency is injectable into the resonator of the ring laser having a variable repetition frequency.

4. An optical unit as claimed in claim 1, wherein the resonator of the ring laser having a variable repetition frequency is provided with a segment in which current is injectable into the resonator.

5. An optical unit as claimed in claim 1, wherein the resonator of the ring laser having a variable repetition frequency is provided with means with which the temperature of the resonator is variable.

6. A high-frequency carrier transmission system comprising a receiver which is provided with an optical unit as claimed in claim 1.

* * * * *